Patented Jan. 17, 1939

2,144,352

UNITED STATES PATENT OFFICE 2,144,352

RESINOUS PRODUCT

Paul D. Watson, Alexandria, Va., dedicated to the free use of the People in the territory of the United States No Drawing. Application July 8, 1938,
Serial No. 218,101

5 Claims. (Cl. 260—9)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

The object of my invention is to aid the dairy industry by increasing the use of lactyllactic acid and lactose, which are available in large quantities as by-products.

My invention has as further objects, the production of new resins, made principally from above-mentioned by-products, and a new process for making the same.

A further object resides in the production of coating compositions comprising my resins.

Since lactyllactic acid possesses the properties of a monobasic acid and of an alcohol, it is consequently capable of self-resinification, which results from esterification reactions occurring between the hydroxyl and carboxyl groups. I have found, however, that it is not practical to produce a commercial resin from lactyllactic acid alone. My researches have shown that the addition of a hard sugar of high molecular weight such as lactose, greatly facilitated the formation of hard water-resistant resins. The fact that the lactose molecule contains at least eight reactive (OH) groups probably accounts for its value in the building up of a three dimensional molecular structure and thus accelerating the conversion of the resin from the fusible to the infusible state.

In practicing my invention, it is preferable to start with concentrated lactyllactic acid of approximately 111% total acidity (calculated as lactic acid) which may be made from aqueous lactic acid by distillation with a high boiling water entraining liquid, such as xylene or kerosene, which serves to remove the free and combined water to form a highly concentrated lactyllactic acid. This product contains over 90% of lactyllactic acid, and only a small amount of lactide, and, I have found that moderate amounts of lactose may be readily dissolved upon heating in this acid. I have also discovered that it is preferable to use an amount of lactose which varies between 5% and 20% of the total weight of the mixture.

The addition of smaller amounts of benzoyl and/or vanadium chlorides serves to modify the formation of the hard water-resistant resins which are formed after heating for approximately 2 to 6 days at 150° C. The addition of benzoyl chloride tended to somewhat inhibit the darkening and the hardening of the resin, and was of value in the production of a fusible resin. The addition of vanadium chloride and/or furfurol facilitated the production of an infusible and very water-resistant resin. The hardest, most water-resistant resins, were dark brown in color and were infusible.

I have found that other disaccharides, such as sucrose, maltose, or raffinose, may be substituted for lactose in making my resins.

My resins are particularly valuable in coating compositions, as they possess adhesive properties and water resistance. The hard resins may be dissolved in the mono-methyl or mono-ethyl ethers of ethylene glycol and diluted with lower boiling solvents, such as acetone, benzol, or toluol, in order to make water resistant finishes.

The following examples are illustrative of the method of carrying out my invention:

Example I

Lactyllactic acid of about 90% concentration was heated to a temperature of 160° C. to 170° C.; 5% by weight of lactose was introduced and heated continuously until the lactose was dissolved and the solution was clear, after which 0.15% benzoyl chloride and 2.5% furfurol, by weight, were added, while stirring. The mixture was then poured into a tray and heated at a temperature of 150° C. for 4 days. A dark brown, fusible water-resistant, resin was obtained.

Example II

Lactyllactic acid of about 90% concentration was heated to 160° C. to 170° C., and 10% by weight of lactose was added and heated continuously until dissolved. Approximately 0.5%, by weight, of vanadium chloride was added to the solution, while stirring, after which the mixture was poured into a tray and heated at temperature of 150° C. for 6 days. A dark brown, infusible, highly water-resistant, resin was obtained.

It is to be understood that the foregoing description is given merely by way of illustration and that different embodiments of this invention may be made without departing from the spirit thereof.

Having thus described my invention, what I claim for Letters Patent is:

1. A resin, comprising the products of the reaction between concentrated lactyllactic acid, a disaccharide and modifying agents, which has the property of being water-resistant.

2. A resin, comprising the products of the reactions between concentrated lactyllactic acid, lactose and vanadium chloride.

3. A resin, comprising the products of the reactions between concentrated lactyllactic acid, lactose, benzoyl chloride and furfurol.

4. A process of making a resin, which comprises dissolving a disaccharide in concentrated lactyllactic acid at temperatures ranging from 160° C. to 170° C., thence adding modifying agents, thence heating the mixture at a temperature of substantially 150° C. for periods ranging from 2 days to 6 days.

5. A process for making a resin, which comprises dissolving substantially 10% by weight of lactose in concentrated lactyllactic acid at temperatures ranging from 160° C. to 170° C., thence adding substantially 0.5% by weight of vanadium chloride, thence heating at a temperature of substantially 150° C. for periods ranging from 2 days to 6 days.

PAUL D. WATSON.